(12) United States Patent
Lorek

(10) Patent No.: US 6,412,301 B1
(45) Date of Patent: Jul. 2, 2002

(54) PREFERABLY ABSORPTION REFRIGERATOR AND A VEHICLE EQUIPPED WITH SUCH A REFRIGERATOR

(75) Inventor: Manfred Lorek, Stegen (DE)

(73) Assignee: Electrolux Siegen GmbH, Seigen (DE)

( * ) Notice: Subject to any disclaimer, the term of this patent is extended or adjusted under 35 U.S.C. 154(b) by 0 days.

(21) Appl. No.: 09/660,793

(22) Filed: Sep. 13, 2000

(30) Foreign Application Priority Data

Sep. 14, 1999 (DE) .......................................... 199 43 819
May 19, 2000 (DE) .......................................... 100 24 893

(51) Int. Cl.⁷ .............................. F25B 15/00; B60H 1/32
(52) U.S. Cl. .......................................... 62/476; 62/244
(58) Field of Search .......................... 62/476, 244, 298, 62/239; 312/236, 318

(56) References Cited

U.S. PATENT DOCUMENTS 3,245,224 A * 4/1966 Wilkinson .................. 62/239
3,512,371 A * 5/1970 Gurt et al.
3,771,320 A * 11/1973 Kenneryd et al. ............ 62/239
5,782,105 A * 7/1998 Stork ....................... 62/476 X
5,946,929 A * 9/1999 Selina et al. .............. 62/476 X

* cited by examiner

Primary Examiner—Denise L. Esquivel
Assistant Examiner—Chen-Wen Jiang
(74) Attorney, Agent, or Firm—Pearne & Gordon LLP

(57) ABSTRACT

An absorption refrigerator and a vehicle wherein the vehicle inside space is reliably sealed from an air duct servicing a gas burner for the absorption refrigerator. At least one cutout (28, 30) is provided at the housing edge between a housing top side (6) and a housing rear panel (8), the lines (10 through 24) passing through this cutout, from the housing top side (6) to the housing rear panel (8), without projecting above the housing at said edge (4). Accordingly the lines passing over the housing edge will not project above the housing dimensions at said edge because all lines in that zone run virtually inside the housing on account of said cutout.

12 Claims, 4 Drawing Sheets

PREFERABLY ABSORPTION REFRIGERATOR AND A VEHICLE EQUIPPED WITH SUCH A REFRIGERATOR

BACKGROUND OF THE INVENTION

The invention relates to a refrigerator preferably operating on the absorption principle, and to a vehicle equipped with such a refrigerator.

In most RVs (recreational vehicles), a refrigerator is included among the kitchen appliances. As a rule an absorption refrigerator is used because such equipment operates noiselessly compared to compressor-driven refrigerators.

In order that this refrigerator be operative regardless of RV location, it is designed in such a way that its heating system required to separate its water and ammonia can be operated selectively by means of the on-board 12 V battery, by the public AC power supply of 120 or 220 V, by the vehicle fuel (gasoline or diesel) or by LPG (liquefied petroleum gas).

As a result a large number of lines must run to and from operating controls and displays. Illustratively a control is a toggle selecting the energy source and a toggle to control the gas feed. Correspondingly one needs lines carrying 12 VDC or 110 or 220 VAC as well as a gas line to the burner, an ignition line and a gas line from the gas tank.

Because the cooling unit of the absorption refrigerator in general is mounted on its back panel, the line must ipso facto run from the refrigerator housing's back panel over an upper housing edge and from the top side of the housing to the front of the equipment.

Another boundary condition is set by the standard G 607, i.e., DIN EN 1949, which specifies that refrigerators in RVs, mobile homes, and other vehicles, must be installed in suction-protected manner. In other words, the air of combustion of the burner of the absorption refrigerator may not come from the vehicle inside and the burner exhaust gases must be prevented from directly entering the vehicle.

It follows from these two boundary conditions that it is particularly difficult and expensive to the seal the inside space of the vehicle from the absorption refrigerator, i.e., from the air duct needed by its burner, especially in the light of the lack of surface continuity caused by the-plurality of lines.

SUMMARY OF THE INVENTION

The solutions to such problems of the state of the art, such as disclosed in the European patent document 0 888 295 A2, the German patent document 33 30 37 C2 and in U.S. Pat. No. 3,512,371, have remained unsatisfactory with respect to costs and complexity and furthermore regarding sealing performance.

In the light of this state of the art, it is the objective of the present invention to create an absorption refrigerator and a vehicle fitted with same, wherein the vehicle inside space is sealed in especially simple manner from the burner's air duct, as a result of which even the layperson, provided he or she applies appropriate care, shall be able to property install such sealing, also when integrating the refrigerator into the vehicle.

This problem is solved by providing at least one recess or cutout at an edge defined by the housing top side, and/or by a housing side panel, and/or by an underside of the housing, and a housing back panel. The cutout is crossed by the lines running toward the housing back panel without exceeding the housing height at the housing edge between the housing top side and the housing's side panel or its underside.

In this manner the housing edge is free of elevations above the local housing dimensions on account of the lines in that region because the cutout in that zone practically makes all said lines run inside the housing. Sealing therefore is especially simple precisely at this critical site.

In an advantageous embodiment of the invention, a separation device is present in the cutout to assure that the lines in that zone shall run from the refrigerator top side to its back panel in substantially airtight manner. In order to attain especially simple sealing, for instance, using only a single sealing lip, the separation device shall be designed in especially advantageous manner so that it shall provide a continuous housing edge.

In a further embodiment of the invention, the separation device solves a problem which hitherto was not solved or only inadequately in this zone, namely, it provides a suction protection for the lines running to the operating controls and displays of simple design which is easily installed, provided that at least part of the lines fitted with suction protection relating to the operating controls and displays can be mounted in the separation device. This feature illustratively applies to snaking electric cables, also gas lines, through so-called labyrinths. An appropriate separation device may be easily manufactured as a plastic injection-molded part.

Assembly of the separation device assembly is especially easy if it is locked or snapped into the cutout.

In another especially simple design of the invention relating to installation and suction protection, the separation device is in two parts, namely, a lower and an upper part, the lines being received in seats in the lower part and the upper part being affixable to the lower part while cooperating with said seats. Preferably this affixation is implemented by snapping in position or by screwing in place.

Regarding the vehicle equipped with a refrigerator of the above kind, the problem stated above is solved in that an air duct is present between a first ventilation register in the vehicle wall, which feeds air to the refrigerator burner, and a second ventilation register in the vehicle wall to expel the burner exhaust gas, the refrigerator rear panel being part of the air duct wall and this air duct being substantially gas-tight relative to the sealing lip affixed to the refrigerator's housing edge.

The above combination of features will be better understood in that there are two assembly variations for the concept of "coming to rest against the housing edge". According to one variation, this expression means that the sealing lip is mounted in the refrigerator bay and in fact does rest against the housing edge which in part is defined by the separation device. According to the other variation, it means that the sealing lip is mounted on the housing edge and thereby rests against the bay's wall.

This configuration assures that even the layperson can be expected to mount a simple sealing lip at a given site before installing the refrigerator in his vehicle, said sealing lip automatically coming to rest against the refrigerator housing already solely by the design of the refrigerator of the invention, that is without further action by the layperson or the expert, namely in the vicinity of the rear, upper housing edge, that is, tightly against the wall of the refrigerator bay. Therefore a permeable air duct can only be produced if, by gross neglect of these extremely simple installation instructions, the sealing lip is not mounted at all on account of forgetfulness or was installed in an absolutely amateurish manner.

In an appropriate feature of the invention, the air duct is at least partially heat-insulated relative to the vehicle's inside space. As a result, heat loss in this inside space-which sometimes induces the vehicle user to externally close the ventilation registers in the vehicle wall—is substantially reduced The installation of the refrigerator into the vehicle is especially simple when the sealing lip in the form of an air-duct component is mounted in this air duct before the refrigerator rear panel is added. In this manner the sealing lip already is installed when the refrigerator is conventionally inserted into its vehicle bay.

DETAILED DESCRIPTION OF THE INVENTION

Figure 1:
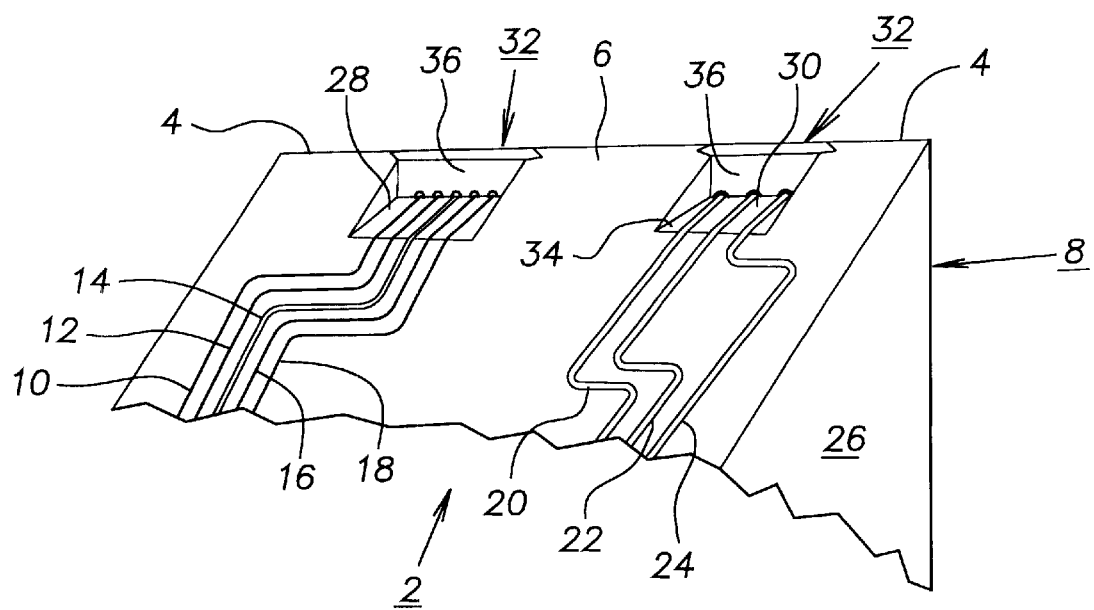
FIG. 1 is a perspective of a top view cutaway of an absorption refrigerator.

FIG. 1 is a top view of an absorption refrigerator 2 in the zone of a housing edge 4 between a housing top side 6 and a housing rear panel 8. Two 12 VDC lines 10, 12, one ribbon cable 14, two 220 VAC lines 16, 18, one gas feed line 20 leading to an omitted gas burner mounted at the rear, an ignition line 22 for said gas burner and a gas feed line 24 from an omitted gas tank all run on the housing top side 6. The housing top side 6 and the housing rear panel 8 are components of a thermally insulated (foam-covered) housing 26 which in this artists rendition encloses an omitted inside space, the actual useful space.

Two recesses or cutouts 28 and 30 are situated in a zone of the housing top side 6 facing the housing rear panel 8. The electric lines 10 through 18 pass through the cutout 28 shown leftward in FIG. 1 in such a manner that they lie inside the profile of the housing 26 in the vicinity of the housing edge 4 and therefore will not project above the height of the housing. A separation device 32 composed of a base part 34 and plug-in part 36 is used to affix the lines 10 through 18, with the base part 34 installed prior to foam installation during the housing assembly, During final assembly, the electric lines 10 through 18 and the ribbon cable 14 are placed in the base part and then are affixed using the plug-in part 36, which forms a seal around the lines 10 through 18 and the ribbon cable 14.

Figure 2:
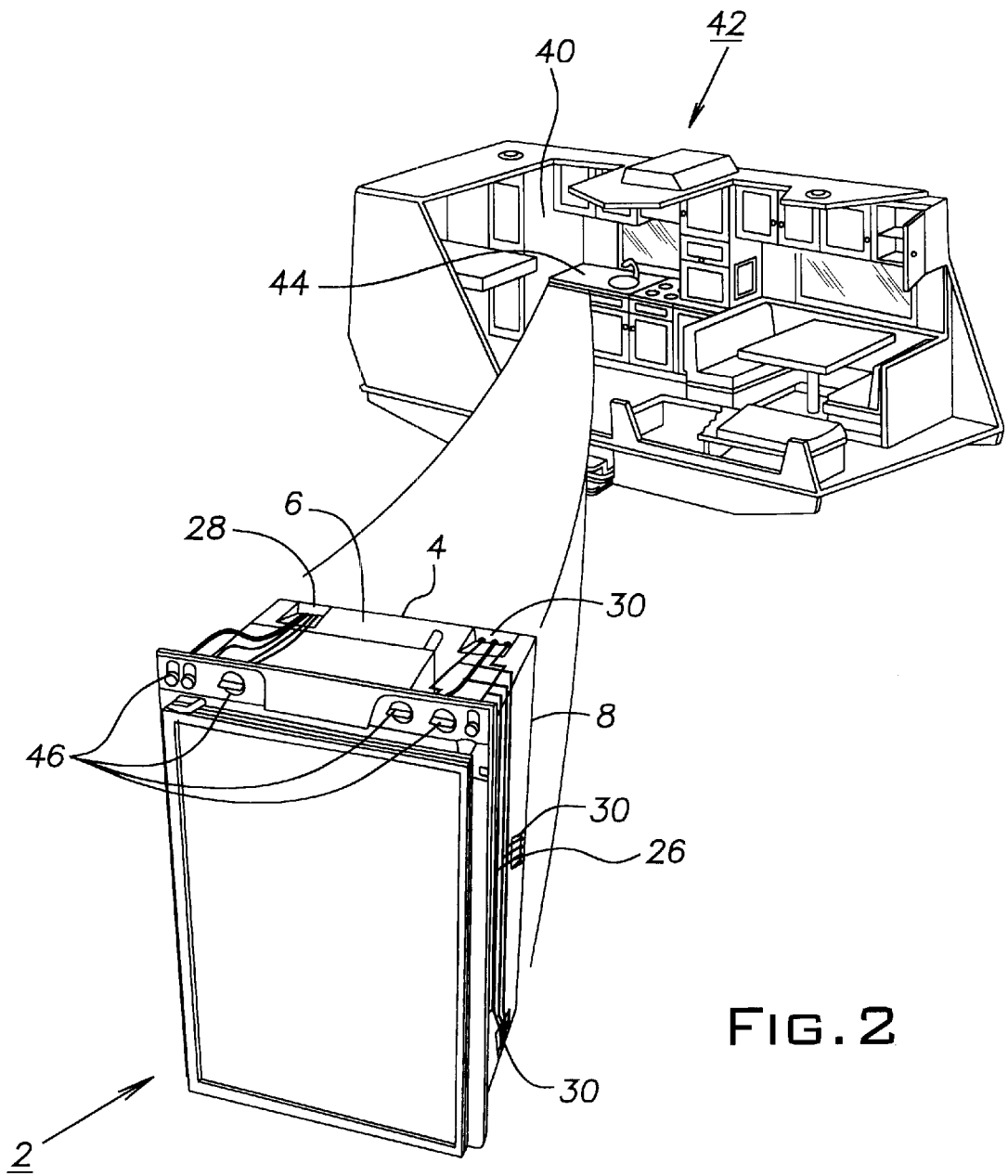
FIG. 2 is a perspective relating to installing the absorption refrigerator of FIG. 1 in a mobile home.

The gas feed lines 20 through 24 are guided in corresponding manner in the cutout 30 as shown on the right in FIG. 1. As shown in FIG. 2, the lines may also be guided in cutout 30 when the cutout is situated in a zone of the housing side panel or bottom panel.

On account of the cooperation of the cutouts 28, 30 with the separation devices 32, a guide means has been created for all the lines 10 through 24 running from the housing top side 6 to the housing rear panel 8 to make the zones in the direct vicinity of the edge 4 flush and smooth. Separation of gases between the housing rear panel 8 and the remaining housing surfaces therefore can be easily implemented, for instance using a sealing lip, not shown in this instance, which can be easily affixed to said edge.

FIG. 2 is a perspective of an illustrative installation of the absorption refrigerator 2 inside a space 40 of a mobile home 42. The absorption refrigerator 2 comprises controls 46 mounted on the front panel and is being moved, its front panel outward, into a bay 44. For reliable operation of the absorption refrigerator 2, its cooling unit requires a heater for water/ammonia separation, said heater being selectively powered from the 12 V on-board battery or from 220/110 VAC line, or by gas fuel.

Figure 3:
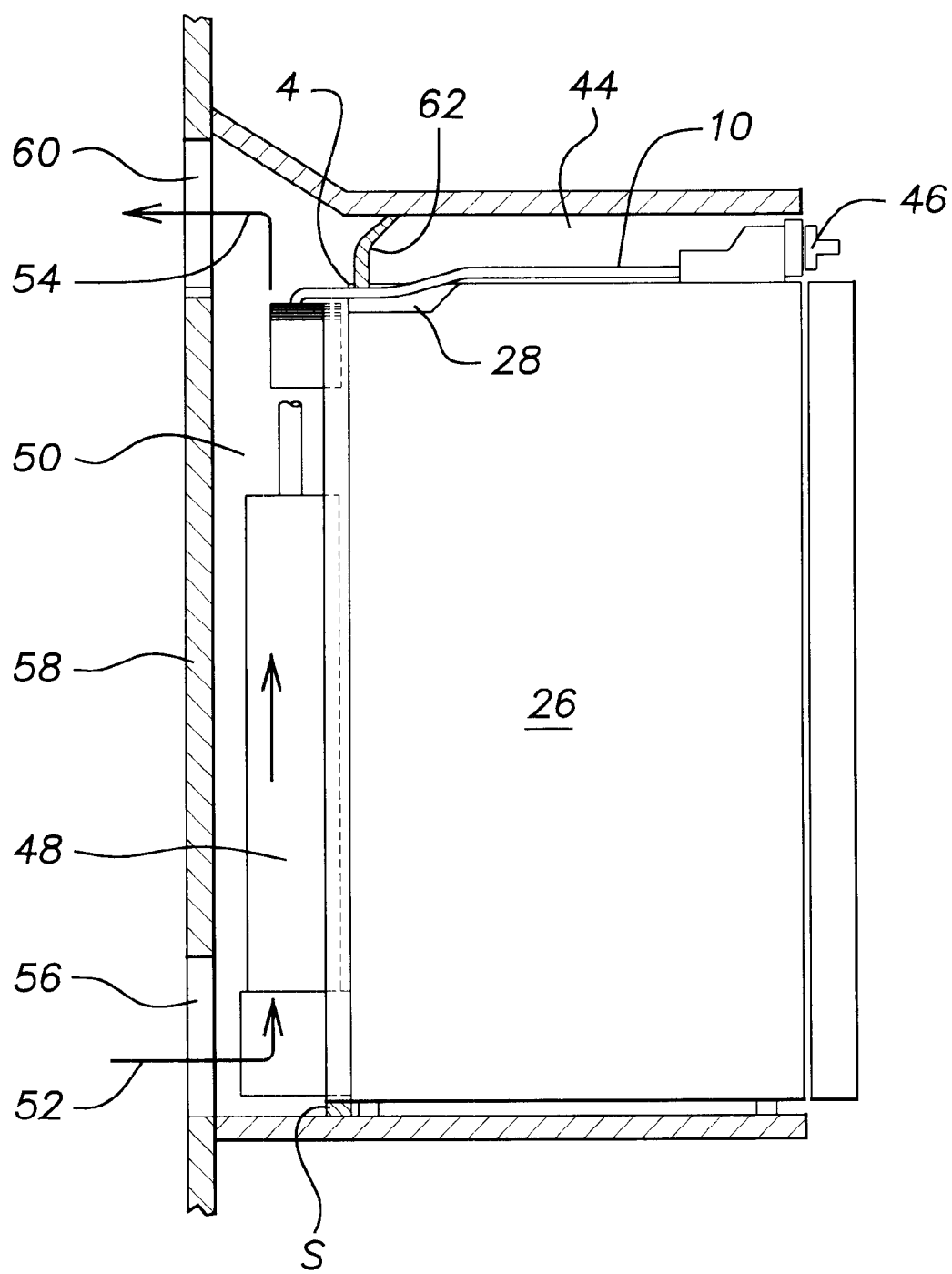
FIG. 3 is a longitudinal section of the installed absorption refrigerator of FIG. 1 comprising a sealing lip, of a first embodiment mode.

When powering said refrigerator with gas fuel, a gas burner 48 is needed, such as schematically shown in FIG. 3 in its installed position and fitted with a sealing lip 62 of a first embodiment. Once the absorption refrigerator 2 has been inserted into the bay 44, an air duct 50 for the air supply to the gas burner 48 and the exhaust gas 54 from said burner shall have been subtended. Consequently the housing's rear panel 8 simultaneously is an integral component of the wall of the air duct 50. At its intake side, this air duct 50 is fitted with a first ventilation register 56 in an outer wall 58 of the mobile home 42, and at its outlet side it is fitted with a correspondingly designed second ventilation register 60.

Figure 4:
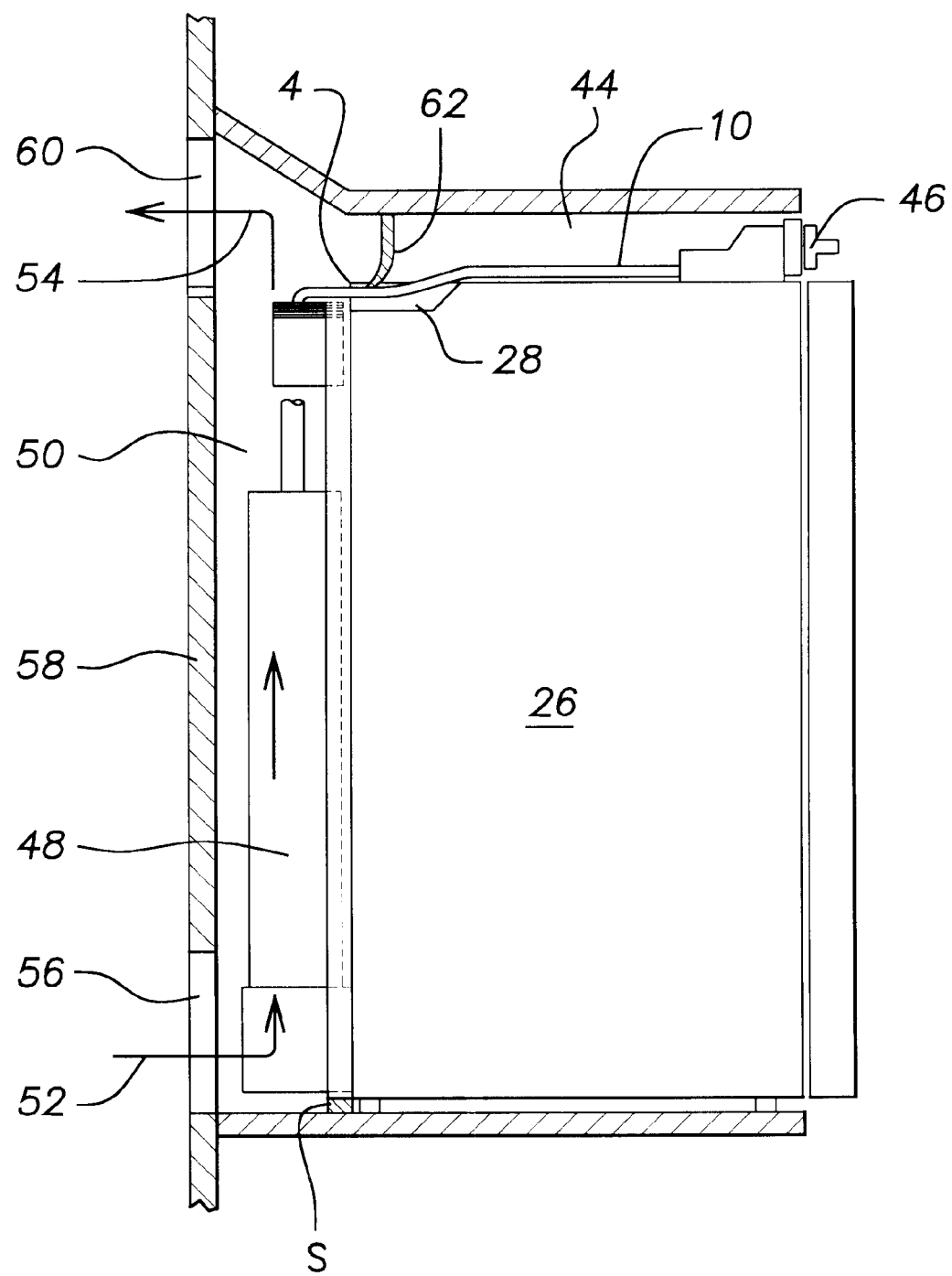
FIG. 4 is a longitudinal section of the installed absorption refrigerator of FIG. 1 comprising a sealing lip, of a second embodiment.

The special problem of hermetically sealing the air duct 50 from the inside space 40 of the mobile home 42 is solved in particular in the critical zone of the rear housing edge 4 by means of the sealing lip 62, which is simple in design, because a smooth refrigerator surface is formed by lowering the line 10 (which is visible in FIG. 3) in the zone of said edge 4. As regards the above first embodiment, the sealing lip 62 is affixed to the housing edge 4 prior to inserting the absorption refrigerator 2 into the appliance bay 4. In this manner the sealing lip 62 is precluded from resting at the wrong depth in the bay against the housing edge 4 when the refrigerator is being inserted, provided that the bay 44 is provided with a depth stop S when the refrigerator 2 is inserted into the bay 44. A pertinent second embodiment is shown in FIG. 4 wherein the sealing lip 62 is affixed to the lower side of the appliance bay 44 before inserting the absorption refrigerator 2.

What is claimed is:

1. An absorption refrigerator (2) comprising a cooling unit mounted on a rear panel (8) of the refrigerator and fitted with a gas burner, said refrigerator having a pair of side panels and a bottom panel, operating controls and/or displays especially accessible on a front panel of said refrigerator, lines (10–24) to and/or from the operating controls and/or displays, one or more cutouts (28,30) at an edge defined by two panels, said lines being guided inside said cutout without projecting from the housing.

2. Refrigerator (2) as claimed in claim 1, characterized in that a separation device (32) is mounted in the cutout (28, 30).

3. Refrigerator (2) as claimed in claim 2, characterized in that the separation device (32) implements a continuously smooth and aligned housing edge (4).

4. Refrigerator (2) as claimed in claim 3, characterized in that at least some of the lines (10 through 24) are mounted in the separation device (32) so as to be suction-protected regarding the operating controls and displays.

5. Refrigerator (2) as claimed in one of claims 2 through 4, characterized in that the separation device (32) is designed to snap into the cutout (28, 30).

6. Refrigerator (2) as claimed in one of claims 2 through 4, characterized in that the separation device (32) consists of two components in the form of a lower part (34) and an upper part (36), the lines (10 through 24) being placed in the seats of the lower part (34) and the upper part (36) being affixable, preferably in snap-in manner, while cooperating with said seats, onto the lower part (34).

7. A vehicle (42) equipped with a refrigerator (2) as claimed in claim 1, characterized in that an air duct (50)

extends from a first ventilation intake register (56) in a wall (58) of the vehicle for burner feed air (52) to a second ventilation register (60) in said wall (58) to expel the burner exhaust gas (54), the refrigerator rear panel (8) being a component of the air duct (50), said air duct (50) being made substantially gas-tight, by means of a sealing lip (62) resting against the housing edge (4) of the refrigerator (2), relative to an inside space (40) of the vehicle.

8. Vehicle (42) as claimed in claim 7, characterized in that the air duct (50) is at least partly thermally insulated from the inside space (40) of the vehicle.

9. Vehicle (42) as claimed in claim 7, characterized in that the sealing lip (62) is a component of the air duct (50) and is mounted into the air duct (50) prior to the assembly of the refrigerator rear panel (8).

10. Vehicle (42) as claimed in claim 7, characterized in that the sealing lip (62) is configured in an appliance bay (44) at the housing edge (4).

11. Refrigerator (2) as claimed in claim 1, characterized in that the one of the two panels is the housing rear panel and the second of the two panels is one of a pair of side panels.

12. Refrigerator (2) as claimed in claim 1, characterized in that the one of the two panels is the housing rear panel and the second of the two panels is a bottom panel.

* * * * *